United States Patent [19]

Moller et al.

[11] Patent Number: 4,735,461
[45] Date of Patent: Apr. 5, 1988

[54] FAILSAFING MEANS FOR AN ANTI-SKID SYSTEM

[75] Inventors: Hubert Moller, Stuttgart; Herbert Schramm, Leonberg; Dieter Worner, Pleidelsheim, all of Fed. Rep. of Germany

[73] Assignee: Robert Bosch GmbH, Stuttgart, Fed. Rep. of Germany

[21] Appl. No.: 40,903

[22] Filed: Apr. 21, 1987

[30] Foreign Application Priority Data

Jul. 17, 1986 [DE] Fed. Rep. of Germany ....... 3624159

[51] Int. Cl.⁴ .......................... B60T 8/32; B60T 13/00
[52] U.S. Cl. .................................... 303/7; 188/181 R; 303/92; 303/111
[58] Field of Search ....................... 303/7, 20, 92, 111, 303/93, 100, 102, 119, 113, 91; 188/181 R, 181 C, 181 A

[56] References Cited

U.S. PATENT DOCUMENTS 3,756,661 9/1973 Michellone ........................... 303/7

FOREIGN PATENT DOCUMENTS 1599086 9/1981 United Kingdom .

Primary Examiner—Douglas C. Butler
Attorney, Agent, or Firm—Edwin E. Greigg

[57] ABSTRACT

A failsafing device is proposed for an anti-skid system of a tractor-trailer combination. If the trailer anti-skid system fails at the rear axle, instead of shutting off the entire anti-skid system of the trailer, the anti-skid control at the front axle of the trailer is maintained.

2 Claims, 1 Drawing Sheet

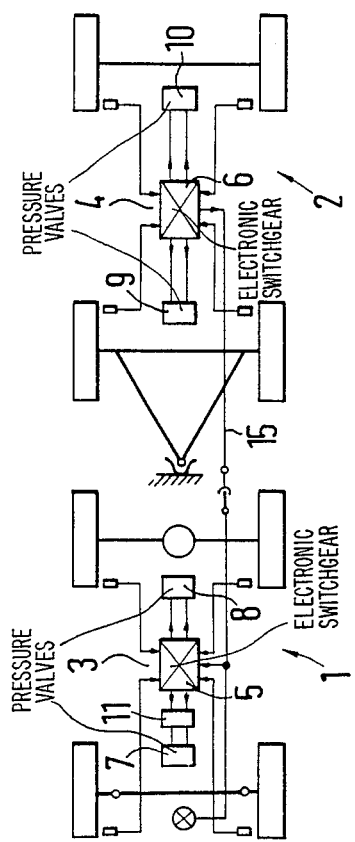

FAILSAFING MEANS FOR AN ANTI-SKID SYSTEM'

FIELD OF THE INVENTION

The invention is directed to improvements in anti-skid systems as they are applied to tractor-trailer combination vehicles.

BACKGROUND OF THE INVENTION

An anti-skid system of this general kind is known in the prior art and disclosed in German Offenlegungsschrift No. 27 57 911.

In such known anti-skid systems, if both control channels of the rear axle of a tractor vehicle fail, the front axle control must be certain laws, such as those in the European Economic Community under ECE Regulation, Appendix 13, be shut off as well. Thus, tractor vehicle is left without any anti-skid control at all.

For the sake of economy and compatibility, the same anti-skid system is used for the trailer as for the tractor vehicle. If the anti-skid system has failed at the rear axle or axles of the trailer, then the anti-skid system of the front axle of the trailer is shut off completely as well, even though ECE Regulation Appendix 13 would allow continued control of the two wheels of the front axle of the trailer.

OBJECT AND SUMMARY OF THE INVENTION

It is a principal object of the invention to provide failsafing means having the advantage over the prior art that the braking capacity of the tractor-trailer vehicle is better maintained in its entirety and better secured, because instead of a failure of the anti-skid system at all the trailer axles, anti-skid control at the front trailer axle is still possible.

It is a further object of the invention and very advantageous that no special apparatus is needed to attain this object; instead, a signal emitted by the apparatus that is already being used for attenuating yawing moment is simply used for appropriately switching over the trailer anti-skid system as well.

The invention will be better understood and further objects and advantageous thereof will become more apparent from the ensuing detailed description of a preferred embodiment taken in conjunction with the drawings.

BRIEF DESCRIPTION OF THE DRAWINGS

FIG. 1 is a simplified drawing of a tractor-trailer type motor vehicle; and

FIG. 2 is a comparison of the failsafing means disclosed in the prior art with that of the present invention.

DESCRIPTION OF THE PREFERRED EMBODIMENT

Referring now to FIG. 1, there is shown a motor vehicle which comprises the tractor vehicle 1 and the trailer 2. Both vehicles are equipped with an anti-skid system 3 and 4, respectively, each of which is provided with an electronic switchgear 5 and 6, pressure valves 7, 8 and 9, 10, respectively, and wheel sensors. The sensors pick up the rotational status of the vehicle wheels and emit their signals to the electronic switchgear 5 and 6. From there, the pressure valves 7, 8 and 9, 10, which regulate the pressure in brake cylinders, not shown, associated with the wheels, are triggered. The numeral 15 denotes an electrical connection line provided between the tractor and the trailer anti-skid systems for control signal communication therebetween.

The anti-skid system 3 of the tractor vehicle 1 is embodied in accordance with ECE Regulation Appendix 13 such that if the anti-skid control at the rear axle (pressure control valve 8) fails, the front axle control is automatically switched off as well.

The anti-skid systems 3 and 4 are provided with a device which, upon use of the otherwise structurally identical switchgear 5 or 6 for the anti-skid system, can recognize whether such active use is taking place in the tractor vehicle or in the trailer.

This recognition signal, which comprises a ground encoding in the external wiring of the electrical switchgear 5 or 6, enables tractor-vehicle-specific control functions for a tractor vehicle, such as yawing moment control by means of a device 11 for attenuation of yawing moment on the front axle.

In the absence of this ground encoding, the yawing moment control is not enabled; this can also be is the case with the trailer anti-skid control.

This already existing device for enabling or not enabling of tractor-vehicle-specific control options can now be used not only for enabling the yawing moment control, but further can be used for the trailer-specific emergency function according to the invention as well.

That is, it must be noted that the trailer anti-skid system 4 is largely identical in design to the tractor vehicle anti-skid system 3. Under a non-enabling setting of the yawing moment control, however, the trailer anti-skid system 4 does not suffer the same shutoff of the front axle control, as the tractor vehicle anti-skid system 3 does. Instead, a shutoff of the trailer rear axle anti-skid control is possible, without shutting off the front axle anti-skid control of the trailer.

The type of trailer wiring described is shown in FIG. 2, where a technically dictated failure is indicated by the symbol X, the normal anti-skid function is symbolized by a circle symbol, and the legally required or structurally dictated shutoff according to the prior art is indicated by the symbol ⊗. This prior art shut-off was performed earlier, even though technically no error had occurred at the corresponding vehicle axis.

The uppermost row represents the failure of the kind that occurred in the prior art, in this case failure of the rear axle. The second row shows the resultant consequence that takes place in the prior art due to the failure of the rear axle; that is, failure of the rear axle also dictates a shut-off of the front axle as well (⊗).

The third and fourth rows now show the situation according to the invention. With a failure (X) of the rear axle, as shown in row four, the anti-skid function is maintained (o) at the trailer front axle.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A failsafing means for an anti-skid system of a motorized truck vehicle, said truck vehicle comprising a tractor vehicle and a trailer, said tractor vehicle and said trailer each having at least one front and one rear axle, said tractor and trailer each being provided with substantially the same anti-skid system wherein upon a failure of two control channels provided at the at least one rear axle of said trailer control of the front axle of said trailer is shut off as well, said truck vehicle having a device for attenuating yawing moment and producing a signal indicative of presence of a yawing moment, said truck vehicle further having means connected to both said anti-skid systems fo recognition of operation of either said anti-skid system, said means for recognition including an encoding means connected to a switchgear provided in each said anti-skid system, said truck vehicle including further means for processing said signal from the yawing moment attenuation device to allow continued control of the trailer front axle upon said failure of the two control channels at the at least one rear axle of the trailer, whereby the front axle anti-skid system may remain on and effective.

2. A failsafing means as defined by claim 1, further wherein said encloding means comprises a ground encoding of external wiring of said anti-skid system switchgear.

* * * * *